COMBINED GAS SHUT-OFF UNIT AND SAFETY PILOT
Filed Sept. 16, 1960 2 Sheets-Sheet 1
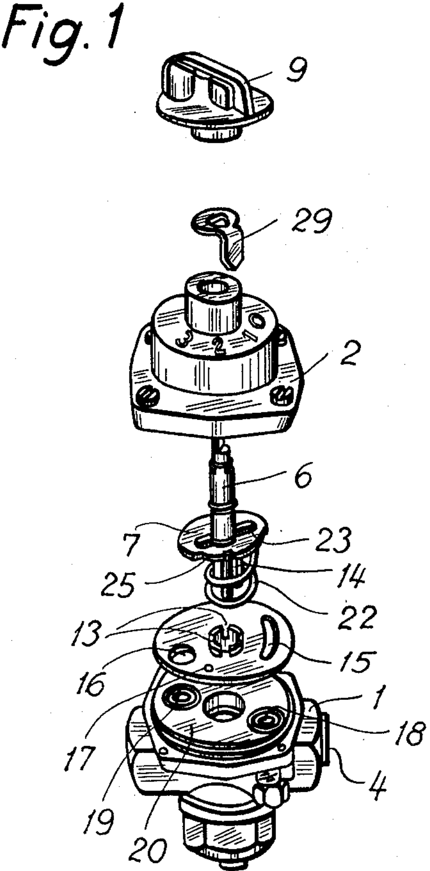
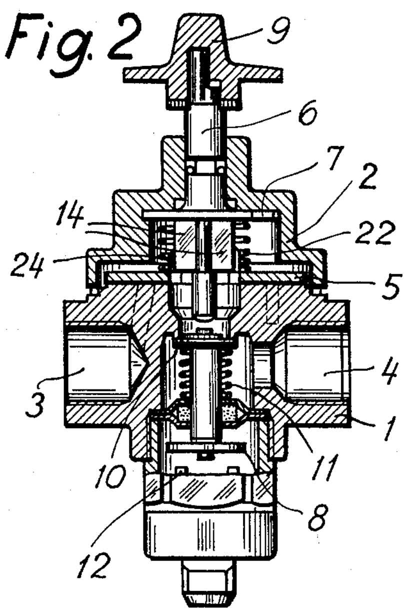
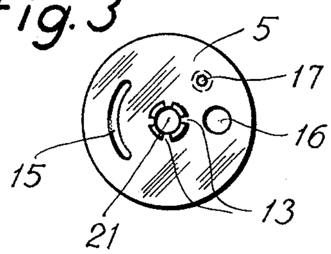
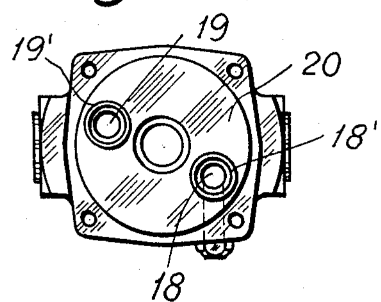
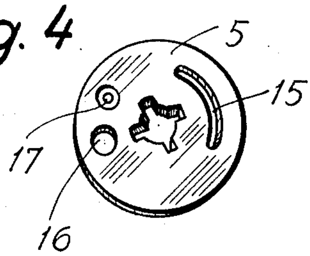

Sept. 29, 1964 J. V. BAATRUP 3,150,712
COMBINED GAS SHUT-OFF UNIT AND SAFETY PILOT
Filed Sept. 16, 1960 2 Sheets-Sheet 2
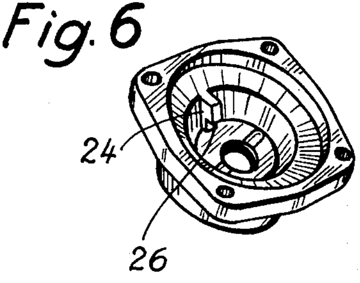
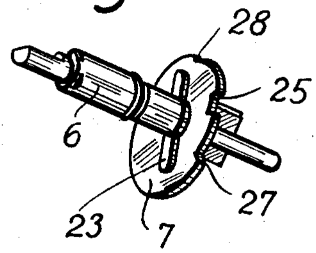
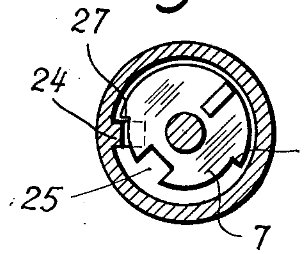
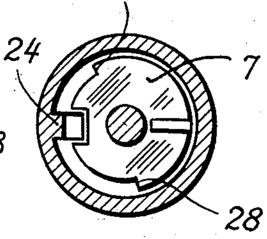
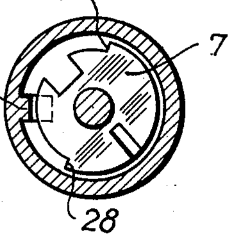
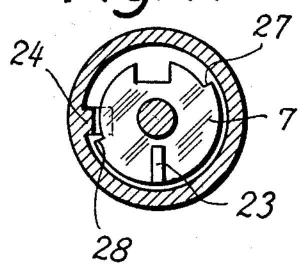
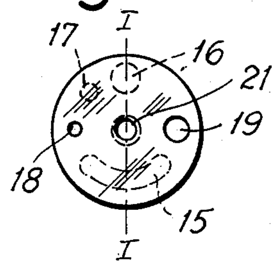
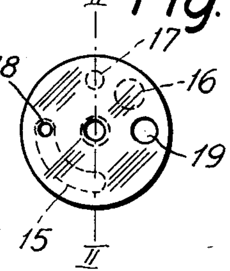
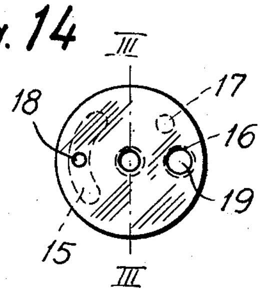
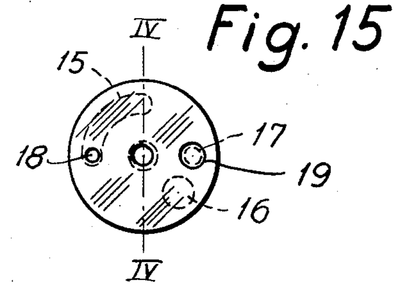

3,150,712
COMBINED GAS SHUT-OFF UNIT AND SAFETY PILOT

Johannes Vagn Baatrup, Sonderborg, Denmark, assignor to Danfoss ved ingeniør Mads Clausen, Elsmark, Nordborg, Denmark Filed Sept. 16, 1960, Ser. No. 56,491
Claims priority, application Denmark, Sept. 22, 1959, 3,369/59
3 Claims. (Cl. 158—131)

The invention relates to a thermo-electrically controlled combined gas shut-off unit and safety pilot with an inflow valve which can be manually displaced in an axial direction by means of a spindle and which in its open position is retained by an electromagnet overcoming the action of a spring and receiving current from a thermo-element which is adapted to be heated by a pilot burner. The said inflow valve is adapted to shut-off the inflow opening of the unit from a chamber which communicates with and may be cut off from main burner and pilot burner alike.

Such a combined gas shut-off valve and safety pilot are advantageous since thereby the use of a separate shut-off member, usually formed as a cock, is avoided. Such a cock has to be operated separately and can only be made tight with the use of gas tap grease which is liable to deposit in the comparatively narrow flow passages to the flame of the pilot burner. In a known shut-off unit of the kind involved here in which the inflow valve can only remain in its open position after the manual operation of the spindle has ceased when the pilot burner has been lighted and is heating the thermo-element there is a special push button for operating the pilot burner.

It is an object of the invention to provide a simple and inexpensive design of a combined gas shut-off unit and safety pilot in which both main burner and pilot burner are operated by means of the same operating button and which eliminates the risk of faulty operation.

This has been accomplished by a combined gas shut-off unit and safety pilot in accordance with the invention, the essential feature of which is a valve disc which is provided in the chamber and has a central inflow opening by means of which it is mounted concentrically about the manually operable spindle. The disc furthermore has a through-going aperture angularly spaced from the arc-shaped aperture of circular arc shape arranged in such manner that when the spindle is turned from a closing position to a lighting position the aperture or duct opening may be passed across an opening communicating with the pilot burner and provided in an underlying supporting surface, in which position the spindle is displaceable longitudinally so as to open the inflow valve. Further, the valve disc has another through-going aperture which in an angular position of the spindle corresponding to a fully open gas shut-off unit registers with an aperture provided in the supporting surface and communicating with the main burner, the circular arc shaped aperture being still simultaneously registering with the aperture duct that communicates with the pilot burner.

Due to its simple construction such a gas shut-off unit is inexpensive to manufacture and it is robust and safe to control, solely by operating a handle provided on the spindle. Faulty operation is impossible since the inflow valve only remains open as long as the pilot burner is burning and when the spindle is retained in an axial direction in the lighting position, from which position it can be further turned so as to open to the pilot burner.

According to the invention the apertures for gas supply control to the main burner and to the pilot burner in the supporting surface are each surrounded by an O-ring disposed in a respective groove provided in the support surface and each constitutes a valve seat. As a result, efficient tightness is obtained without the use of gas tap grease. The gas, which flows from the inflow valve through the central inflow opening of the valve disc, contributes to increase the closing pressure between the valve disc and O-rings.

According to the invention it is convenient that the valve disc has an additional through-going hole the flow area of which is very small in relation to the area of the opening which is provided in the supporting surface and leads to the main burner. On the side where the gas is discharged the hole is surrounded by a conical countersunk part of the disc, the distance between the hole and the aperture corresponding to fully open main burner being less than the diameter of the valve seat surrounding the opening leading to the main burner. By means of the small hole a closely defined minimum combustion in the main burner is obtained without the risk of the latter being screwed so far down that it is put out, and the conical surface on the discharge side prevents the small hole from being clogged by grease or dirt from the gas.

An essential feature of a preferred embodiment of gas shut-off unit according to the invention is that the spindle for fixing the positions of the valve disc is permanently connected with a cam disc which in an extreme position of the spindle is resting in contact with an inside end surface in the casing of the shut-off unit and has one or more ribs projecting radially against the said surface. In the fully open position of the valve disc the ribs enter corresponding depressions in the end surface and in addition the casing of the unit has an inside projecting guiding edge extending in the longitudinal direction of the spindle. In the lighting position the guiding edge is capable of cooperating with a notch provided in the cam disc so as to guide the axial inward displacement of the spindle in the unit and has at its end surface a notch to permit turning of the cam disc between two extreme positions for fully open and closed gas shut-off unit, respectively. The extreme positions are determined by teeth formed at the ends of a peripheral recess in the cam disc. The teeth may strike against the guiding edge inside the notch. By this means is provided a robust fixation of the different positions of the valve spindle without the use of pins unlike the case in cocks with a plug.

According to the invention the spindle has two oppositely disposed projecting guiding webs to cooperate with two of four cross-shaped slits provided in a collar projecting around the inflow opening of the valve disc. The collar forms a guide for a coil spring mounted around the spindle between the cam disc and the valve disc. The coil spring pushes the spindle back in an axial direction when the handle is released after the pilot burner has heated the thermo-element so that the electromagnet keeps the valve open, and due to the cross-shaped slits a cover in which the spindle is mounted can always be placed in such a manner that a scale which in combination with a pointer provided on the spindle indicates the position of the pointer is always facing upwards regardless of the mounting of the shut-off unit.

In order to reduce the friction exerted when turning the valve disc the disc may, on its surfaces facing the supporting surface, have a coating of a friction-reducing material such as Teflon.

The invention will now be further described with reference to the drawing, in which FIGURE 1 is an exploded view of a gas shut-off unit according to the invention, illustrating the individual components, FIGURE 2 is a vertical section through the gas shut-off unit, FIGURE 3 is a top view of the valve disc, that is shown from the side facing away from the supporting surface, FIGURE 4 is a perspective view of the valve disc as seen from the opposite side, FIGURE 5 is the under part of the casing of a shut-off unit with the supporting surface for the valve disc facing upwards, FIGURE 6 is the upper part of the casing of a shut-off unit with guide for the cam surface, viewed from below, FIGURE 7 is the valve spindle, FIGURES 8–11 are sections through the upper part of the casing of a shut-off unit, taken at right angles to the spindle directly beneath the cam disc and showing the cam disc in various positions, and FIGURES 12–15 are schematical representations of the corresponding positions of the valve disc in relation to the apertures of the supporting surface.

The gas shut-off unit consists of a casing or body with an under part 1 and an upper part 2. The under part has an outflow opening 3 communicating with a main burner (not shown) and an inflow opening 4. The upper part 2 has a chamber in which there is disposed a valve disc 5 facing the under part and mounted around a valve stem or spindle 6 which is made integral with a cam disc 7 normally spring-biased to a resting position in contact with an inside end surface in the chamber. When the spindle by means of a handle 9 has been turned from a closing position to a lighting position, it can be displaced in an axial direction together with the cam disc 7, whereby it can force an inflow valve 1 downwards, overcoming the action of a spring 11, into open position, in which a magneto armature 8 is resting against an electromagnet 12 which is fed with current from a thermo-element (not shown) that is heated when the pilot burner is burning.

The valve disc 5 has clutch means comprising an upright collar with four slits 13 arranged opposite each other in pairs and in which guiding webs 14 provided on the spindle enter so that the spindle can be displaced longitudinally in relation to the cam disc 7, but cannot be turned without the cam disc partaking of this movement. As will be seen from FIGURES 3 and 4, the valve disc has an oblong hole 15 of circular arc shape, a large circular hole 16 and a smaller circular hole 17. The valve disc 5 is disposed resting on top of a supporting surface 20 which is shown in FIGURE 5 has circular apertures or duct openings 18 and 19, respectively. These duct openings open into the upper part 2 chamber. The former communicates with the pilot burner and the latter with the main burner through respective ducts shown in broken lines in FIG. 2. The different positions of the valve disc in relation to the apertures or duct openings in the supporting surface will be evident from FIGURES 12–15, in which the openings provided in the suporting surface are indicated by solid lines, whereas the openings in the valve disc are indicated by stippled lines. In FIGURE 12 the valve disc is in closed position in which none of the said openings are overlapping each other. A central hole 21 in the valve disc is, however, in constant communication with the outflow side of the inflow valve 10 so that, when the said valve is opened, gas will flow through the hole 21 and contribute to force the valve disc against the supporting surface. When the valve disc is turned into the position indicated in FIGURE 13 the gas may flow through the hole 15 and the aperture 18 to the pilot burner when the inflow valve is opened, which takes place by displacement of the spindle longitudinally, overcoming the action of the spring 11. When the pilot burner is burning, it will heat the thermo-element in the course of a very short time so that the electromagnet 12 is now capable of keeping the inflow valve open, even though the spindle 6 is returned to its original position. From this position the spindle and the valve disc 5 can be further turned into the position shown in FIGURE 14, in which the hole 16 in the valve disc is opposite the aperture 19 so that gas flows to the main burner, simultaneously there is a constant flow of gas through the aperture 18 leading to the pilot burner. If the valve disc is further turned the amount of gas flowing through the aperture 19 to the main burner is reduced, but before the hole 16 has passed fully by the opening 19, the small hole 17 will have been passed into position over the opening so that the main burner is not put out. FIGURE 15 shows the position of the valve disc at minimum burning of the main burner. When the valve disc is returned to its closing position, FIGURE 12, main burner and pilot burner alike are extinguished by a single movement.

The apertures 18 and 19 are each surrounded by an O-ring, 18' and 19' respectively, which constitute valve seat and are disposed in grooves provided in the supporting surface 20.

When the spindle is not forced inwardly into the casing or body manually, the cam disc 7 is urged up against the inside end surface of the upper part 2 by a spring 22. The cam disc has radially projecting ribs 23 which in the open position, FIGURE 14, of the valve disc are forced into corresponding depressions provided in the wall of the upper part so that the position corresponding to fully open main burner is fixed. In the cylindrical wall of the upper part 2 is formed a projecting guide edge 24 which cooperates with a notch 25 in the cam disc 7 when the spindle and the valve disc have been turned into the lighting position, FIGURES 9 and 13. The spindle 6 can thus only be displaced in its longitudinal direction in lighting position and can only be turned when it has been forced into its outer position by the spring 22, in which position a notch 26 provided in the guiding edge 24 permits turning of the cam disc from closed position, FIGURE 8, where a tooth 27 is resting in contact with the guiding edge 24 inside the notch 26, to the position corresponding to minimum burning of the main burner, FIGURE 11, in which a corresponding tooth 28 is resting in contact with the guiding edge 24.

The top part and the spindle with cam disc can be set in four different angular positions in relation to the valve disc by means of the two oppositely arranged guiding webs 14 which enter oppositely disposed slits 13 provided in the collar of the valve disc. A pointer 29 provided on the spindle and a corresponding scale on the upper part of the casing may thereby always be brought to face upwards.

In order to reduce the friction exerted against turning of the valve disc the said disc may be coated with teflon, and this material and the O-rings can withstand temperatures considerably higher than the temperatures at which cocks with plugs can be used.

What I claim and desire to secure by Letters Patent is:

1. A safety device and shut-off valve combined in a single unit for controlling supply of fuel to a main burner and to a pilot burner comprising a valve body having a chamber defined therein, an inlet in communication with said chamber, an inlet valve element in said body operable to a first position for closing communication between said inlet and said chamber and operable to a second position to allow communication between said inlet and said chamber, means biasing said valve element to said first position, a thermo-electrically activated means adapted to be activated in response to heat from said pilot burner for holding said valve element in said second position, said valve body having two ducts having openings into said chamber, one duct adapted to provide communication with said main burner and the other with said pilot burner, a valve disc in said chamber for opening and closing said duct openings and having two angularly spaced apertures positionable for controlling minimum and maximum supply of fuel to said main burner through said one duct opening and having another aperture for supplying fuel therethrough to said pilot burner through said other duct opening, means defining seats circumferentially of said two openings, said disc being disposed in said chamber in engagement with said seats and overlying said duct openings and in position for being biased by fuel under pressure entering said chamber, a valve stem operable rotatably selectively and operable axially selectively without rotation thereof, clutch means connecting said stem to said disc for angularly rotating said disc to position said apertures therein for controlling fuel supply from said chamber to said main burner and said pilot burner and including means constructed for operation of said stem selectively, axially relative to said disc and independently thereof for engaging said inlet valve element and moving said inlet valve element to said second position under control of said valve stem, said another aperture being configured to maintain communication between said chamber and said pilot burner through the opening of said other duct during rotation of said valve disc under control of said stem for controlling fuel supply to said main burner between said maximum and minimum supply thereof, and said valve disc comprising a central opening for allowing fuel flow from said inlet into said chamber when said inlet valve is in said second position, and said central opening being disposed to allow axial travel therethrough of said valve stem for engaging said inlet valve element to move said valve element to said second position.

2. A safety device and shut-off valve combined in a single unit for controlling supply of fuel to a main burner and to a pilot burner comprising a valve body having a chamber defined therein, an inlet in communication with said chamber, an inlet valve element in said body operable to a first position for closing communication between said inlet and said chamber and operable to a second position to allow communication between said inlet and said chamber, means biasing said valve element to said first position, a thermo-electrically activated means adapted to be activated in response to heat from said pilot burner for holding said valve in said second position, said valve body having two ducts having openings into said chamber, one duct adapted to provide communication with said main burner and the other with said pilot burner, a valve disc in said chamber for opening and closing said ducts openings and having two angularly spaced apertures positionable for controlling minimum and maximum supply of fuel to said main burner through said one duct opening and having another aperture for supplying fuel therethrough to said pilot burner through said other duct opening, means defining seats circumferentially of said two openings, said disc being disposed in said chamber in engagement with said seats and overlying said duct openings and in position for being biased by fuel under pressure entering said chamber, a valve stem operable rotatably selectively and operable axially selectively without rotation thereof, clutch means connecting said stem to said disc for angularly rotating said disc to position said apertures therein for controlling fuel supply from said chamber to said main burner and said pilot burner and including means constructed for operation of said valve stem selectively, axially relative to said disc and independently thereof for engaging said inlet valve element and moving said inlet valve element to said second position under control of said valve stem, said another aperture being configured to maintain communication between said chamber and said pilot burner through the opening of said other duct during rotation of said valve disc under control of said stem for controlling fuel supply to said main burner between said maximum and minimum supply thereof, and said valve disc comprising a central opening for allowing fuel flow from said inlet into said chamber when said inlet valve is in said second position, said central opening being disposed to allow axial travel therethrough of said valve stem for engaging said inlet valve element to move said valve element to said second position, and means constantly biasing said valve stem to a position in which it is disengaged from said valve element.

3. A combined safety device and shut-off valve combined in a single unit for controlling supply of fuel to a main burner and to a pilot burner comprising a valve body having a chamber defined therein, an inlet in communication with said chamber, an inlet valve element in said body operable to a first position for closing communication between said inlet and said chamber and operable to a second position to allow communication between said inlet and said chamber, means biasing said valve element to said first position, a thermo-electrically activated means adapted to be activated in response to heat from said pilot burner for holding said valve in said second position, said valve body having two ducts having openings into said chamber, one duct adapted to provide communication with said main burner and the other with said pilot burner, a valve disc in said chamber for opening and closing said duct openings and having two angularly spaced apertures positionable for controlling minimum and maximum supply of fuel to said main burner through said one duct opening and having another aperture for supplying fuel therethrough to said pilot burner through said other duct opening, means defining seats circumferentially of said two openings, said disc being disposed in said chamber in engagement with said seats and overlying said duct openings and in position for being biased by fuel under pressure entering said chamber, a valve stem operable rotatably selectively and operable axially selectively without rotation thereof, clutch means connecting said stem to said disc for angularly rotating said disc to position said apertures therein for controlling fuel supply from said chamber to said main burner and said pilot burner and including means constructed for operation of said valve stem in one angular position thereof selectively, axially relative to said disc and independently thereof for engaging said inlet valve element and moving said inlet valve element to said second position under control of said valve stem, said another aperture being configured to maintain communication between said chamber and said pilot burner through the opening of said other duct during rotation of said valve disc under control of said stem for controlling fuel supply to said main burner between said maximum and minimum supply thereof, and said valve disc comprising a central opening for allowing fuel flow from said inlet into said chamber when said inlet valve is in said second position, said valve disc being disposed to be biased into engagement with said seats by fuel under pressure in said chamber, and said central opening being disposed to allow axial travel therethrough of said valve stem for engaging said inlet valve element to move said valve element to said second position.

References Cited in the file of this patent

UNITED STATES PATENTS

| | | |
|---|---|---|
| 2,079,743 | Krieger | May 11, 1937 |
| 2,351,732 | Almond et al. | June 20, 1944 |
| 2,515,229 | Jenkins | July 18, 1950 |
| 2,735,439 | Coffey | Feb. 21, 1956 |
| 2,856,994 | Gunar | Oct. 21, 1958 |
| 2,908,293 | Johnson | Oct. 13, 1959 |
| 2,973,183 | Alger | Feb. 28, 1961 |
| 3,030,026 | Wiberg | Apr. 17, 1962 |

FOREIGN PATENTS

| | | |
|---|---|---|
| 438,691 | Great Britain | of 1935 |